United States Patent [19]
Delsanto

[11] Patent Number: 5,191,963
[45] Date of Patent: Mar. 9, 1993

[54] MACHINE FOR GROUPING IN PARALLEL ROWS PRODUCTS ARRIVING IN A SINGLE LINE, PARTICULARLY FOR FEEDING CARTONING MACHINES AND THE LIKE

[75] Inventor: Mario Delsanto, Feletto Canavese, Italy

[73] Assignee: Meca-Tronic S.n.c. di Rusina'V., Spatolisano F., & C., Mappano, Italy

[21] Appl. No.: 838,176

[22] Filed: Feb. 20, 1992

[30] Foreign Application Priority Data

Feb. 26, 1991 [IT] Italy ............... TO91 A-000128

[51] Int. Cl.5 .................................... B65G 25/00
[52] U.S. Cl. .............................. 198/429; 198/463.2
[58] Field of Search ............... 198/429, 463.2, 464.2, 198/464.3, 587, 524

[56] References Cited

U.S. PATENT DOCUMENTS

| | | | |
|---|---|---|---|
| 2,229,348 | 1/1941 | Shurley | 198/429 |
| 2,400,542 | 5/1946 | Davis | 198/429 X |
| 3,204,752 | 9/1965 | Conner | 198/429 |
| 3,416,641 | 12/1968 | Hollenton | 198/429 X |
| 4,039,072 | 8/1977 | Keller et al. | 198/429 |
| 4,131,192 | 12/1978 | Cipolla | 198/524 X |
| 4,645,062 | 2/1987 | Kopp | 198/463.2 X |

FOREIGN PATENT DOCUMENTS 0277125 11/1988 Japan ................... 198/429

Primary Examiner—D. Glenn Dayoan
Attorney, Agent, or Firm—Guido Modiano; Albert Josif

[57] ABSTRACT

The machine includes an actuation chain which is closed in a loop and is provided with a plurality of seats which perform a corresponding closed path, moving from a side for loading individual products to a side for unloading rows of products. A swinging conveyor is arranged at the loading side and, in the row unloading pauses and during the movement thereof, moves in a stepwise manner and aligns with the individual seats in order to deposit therein the continuously fed products.

10 Claims, 3 Drawing Sheets

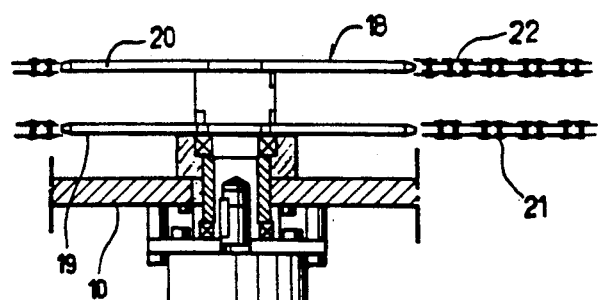
Fig. 2
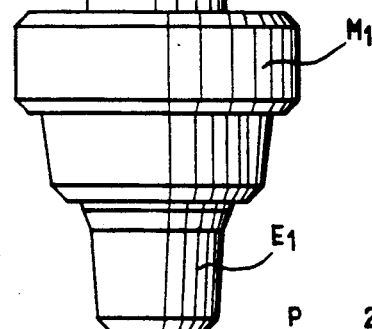
Fig. 3
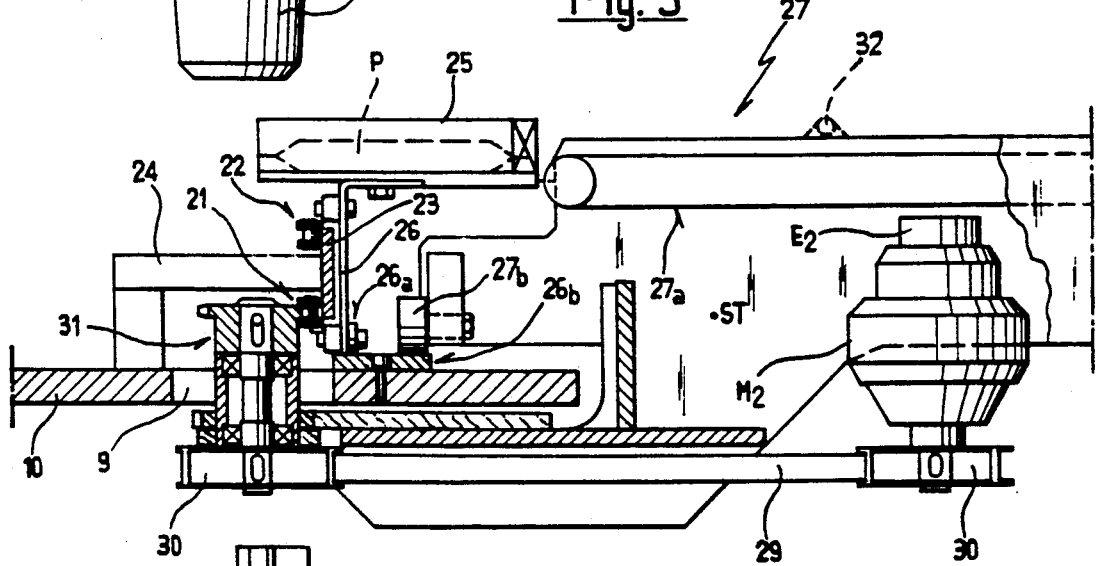
Fig. 4
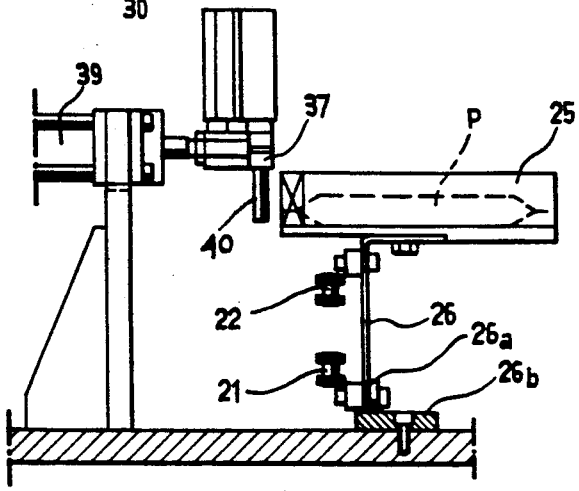

MACHINE FOR GROUPING IN PARALLEL ROWS PRODUCTS ARRIVING IN A SINGLE LINE, PARTICULARLY FOR FEEDING CARTONING MACHINES AND THE LIKE

BACKGROUND OF THE INVENTION

The present invention relates to a machine for grouping in parallel rows products arriving continuously in a single line, for example for grouping products discharged in a single line by a packaging machine and subsequently fed, in appropriately spaced parallel rows, to a cartoning machine arranged downstream of said packaging machine.

It is already known to use, for this purpose, pneumatic and/or mechanical redirection devices which are suitable for directing the flow of products arriving in a single line into a plurality of distinct and separate lines which are in turn divided transversely in order to form the rows.

Said machines, which are based on the use of conveyor belts, are very bulky, do not allow to form very closely spaced rows and require the use of a plurality of appropriately synchronized belts having different speeds.

Intermittent machines are also known wherein the individual products of the line are accommodated, one by one, in corresponding individual rake-like seats which move, by virtue of a complicated actuation system, along a closed path transversely to the direction of flow of the individual line and wherein means are provided which simultaneously unload a plurality of said seats, forming corresponding rows of products.

In these known machines, the rows are unloaded intermittently after a preset group of seats has been filled with products and after said group of seats has been transferred from a loading position to an unloading position wherein the seats of the group are emptied simultaneously. During the transfer and unloading of the seat groups, the flow of products arriving in a single line does not stop; means are therefore provided which feed the individual products into the seats even during the unloading step.

Known arrangements entail, for this purpose, the movement of the entire seat actuation system with respect to the continuously operating single-line feeder so as to always move empty seats into alignment with said feeder.

This solution has many problems, and most of all it does not lend itself to high operating rates, due to the considerable inertial mass of the entire system which is moved. Said inertial mass also makes it very difficult to stop the actuation system in alignment with the conveyor which feeds the products in a single line, so that frequent machine jammings are possible.

SUMMARY OF THE INVENTION

The aim of the present invention is to eliminate these problems and to provide a machine which is capable of high operating rates and at the same time has a limited bulk, is free from jammings and has a simple and reliable structure.

An object of the invention is to provide a machine which has flexible operation, in that it allows to program the number of items, comprised within a maximum limit, which form each row.

In order to achieve the above mentioned aim and object, as well as others which will become apparent from the following detailed description, the present invention is provided, which is based on the concept of processing the single flow of items with a swinging conveyor which moves in a stepwise manner, aligning with the individual seats, during the pauses for the unloading of the rows and during the movement of said rows.

Therefore, the present invention relates to a machine for grouping in parallel rows products arriving in a single line, comprising in combination:

at least one chain which is closed in a loop and is guided by toothed pinions along a path which comprises a side for loading individual products, which has the shape of an arc of a circle, and a straight side for unloading the rows, a plurality of movable seats which are supported by said chain with a constant spacing pitch and are suitable for moving along the entire perimeter of said path to receive the products on the loading side and to carry them to the unloading side, first advancement motor means for moving said chain by steps which are equal in length to the number of products which form each row and for moving the seats from the loading side to the unloading side of the path, a belt conveyor for the single line of products, comprising at least one terminal portion which swings in the horizontal plane and is pivoted at the center of curvature of the circular arc-like loading side of the path of the chain, second advancement motor means which are supported by the swinging portion of the conveyor and mesh with said chain in order to move said terminal portion in a stepwise manner, align its end with the individual seats and feed the products into each seat both during translatory motion and when the first motor means are inactive, means for removing the rows of products from the unloading side of the path of the chain and means for controlling said first and second motor means and for energizing them for a fixed duration according to the translatory motion of each row of seats and, respectively, according to the stepwise movement of the swinging portion of the conveyor.

BRIEF DESCRIPTION OF THE DRAWINGS

Further characteristics and advantages of the present invention will become apparent from the following detailed description and with reference to the accompanying drawings, given by way of non-limitative example, wherein:

FIG. 2 is an enlarged-scale schematic sectional view, taken along the plane II—II of FIG. 1;

FIG. 3 is an enlarged-scale schematic sectional view, taken along the plane III—III of FIG. 1;

FIG. 4 is an enlarged-scale schematic sectional view, taken along the plane IV—IV of FIG. 1.

DESCRIPTION OF THE PREFERRED EMBODIMENTS

Figure 1:
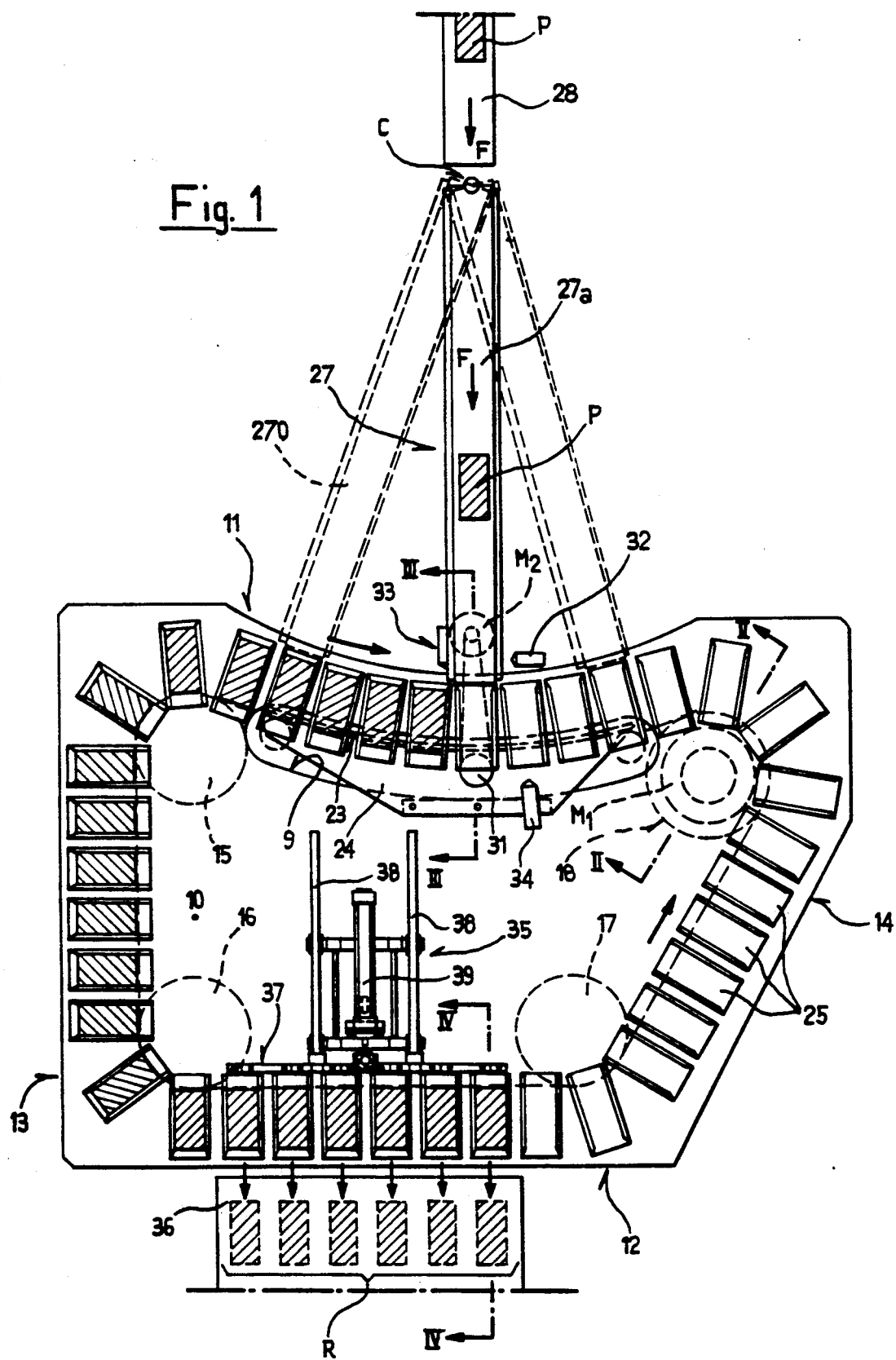
FIG. 1 is a top plan view of the machine according to the present invention.
Figure 5:
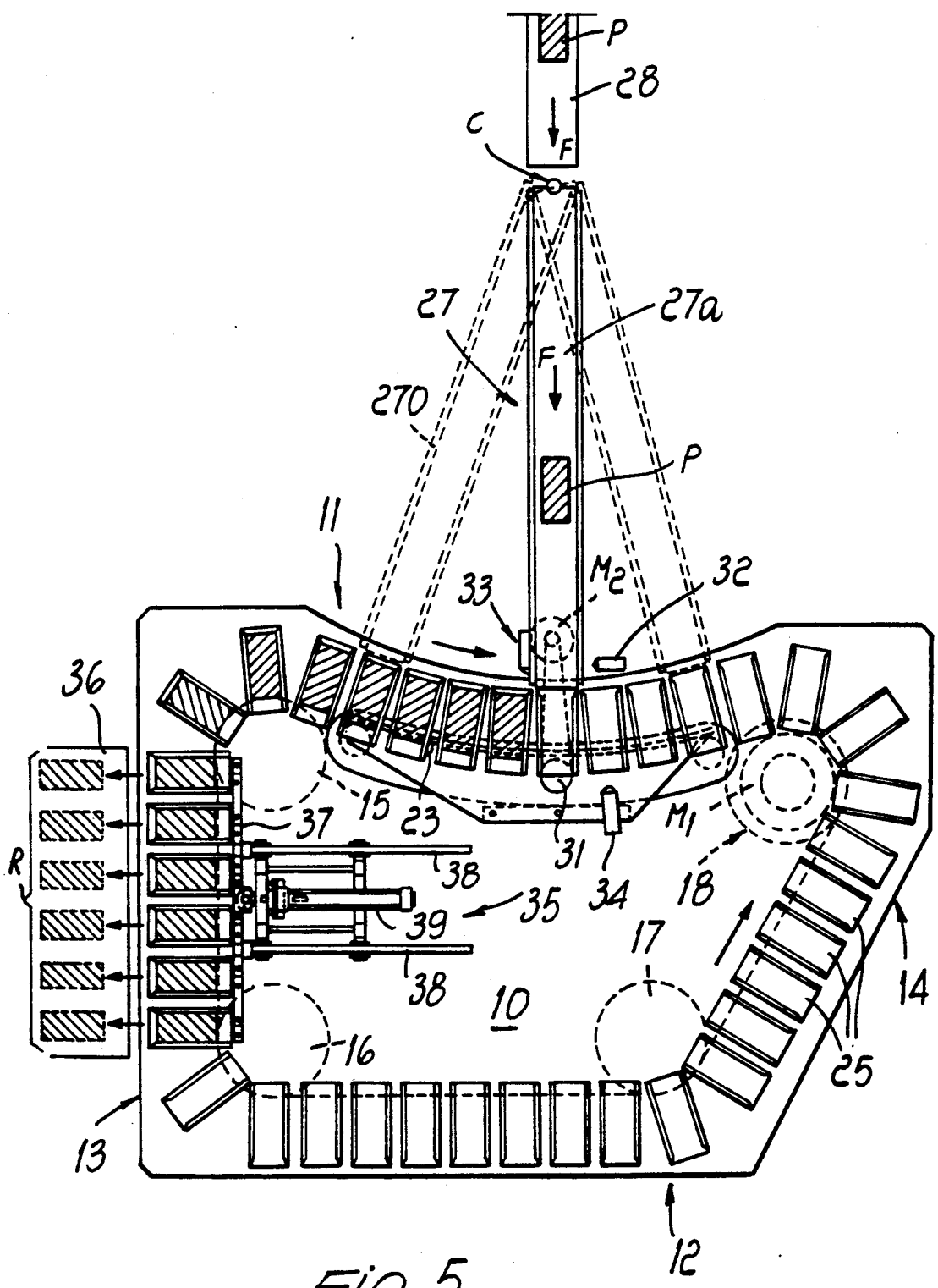
FIG. 5 is a top plan view of the machine according to another embodiment of the present invention.

The machine illustrated in the figures comprises a bed 10 with a perimeter shaped substantially like a trapezoid which comprises a loading side 11 shaped like an arc of a circle, a straight unloading side 12 and two connecting sides 13 and 14, one of which is set at an angle in order to reduce space occupation.

Corresponding freely rotatable guiding pinions 15, 16 and 17 are arranged at three perimetric vertices.

A drive pinion 18 is arranged at the fourth vertex and is actuated by a first advancement motor M1 with which an angular position sensor E1 (encoder) is associated.

Each pinion is formed by a pair of stacked toothed wheels 19-20 (FIG. 2) which mesh with corresponding stacked actuation chains 21-22 which are closed in a loop and are guided by said pinions along a closed path which follows the perimeter of the bed 10.

At the loading side 11, a self-lubricated guide 23 supported by a supporting plate 24 forces the chains to follow the circular arc-like profile of the loading side 11. The chains 21 and 22 are provided with a plurality of identical seats 25 formed by trays with a channel-like cross-section which are open on two sides, are individually fixed to the chains by means of a corresponding bracket 26 and are spaced with a constant pitch. Each bracket 26 is provided with a lower roller 26a which rolls along a supporting track 26b.

The encoder E1 controls the motor M1, making it perform, upon each energization command, such a number of turns as to move the chains 21 and 22 and the seats 25 by an extent equal to the number of products intended to form each row R.

The swinging terminal portion 27 of a belt conveyor 28 for the single product line P is arranged at the loading side 11. The front end of the terminal portion 27, which faces the loading side 11, is adjacent to the seats 25, and the rear end is articulated about a vertical axis which passes through the center of curvature C of said loading side.

A motor (not illustrated) arranged at the articulation axis moves the belt 27a of the conveyor portion 27 in the direction of the arrow F. At its front end, the swinging portion 27 is provided with a second actuation motor M2 which is arranged so that its axis is vertical and with which a corresponding encoder E2 is associated.

The motor M2, by means of a transmission which includes a belt 29 and pulleys 30, or the like, rotates a sprocket 31 which is arranged on the lower side of the structure ST of the conveyor portion 27 and protrudes on the upper side of the bed 10 through an opening 9 of said bed which has a circular profile. The sprocket 31 meshes with the lower chain 21 and, when it is rotated by the motor M2, it rolls thereon, causing the swinging movement of said conveyor portion 27 which rests on the track 26b by means of a roller 27b.

By virtue of the encoder E2, the rotations of the sprocket 31 are proportional to the spacing pitch of the seats 25, so that every time the motor M2 is energized, the sprocket moves the conveyor portion 27 by one pitch value, aligning its end with the progressively adjacent seats 25. An optical sensor, for example a photocell 32 arranged transversely to the belt 27a, indicates the presence of a product P on said belt and sends an energization command to the motor M2.

A second sensor 33 and a third sensor 34, preferably of the magnetic type, are provided respectively in order to check the exact position of the seats 25 upon each single-pitch movement produced by the motor M2 and emit a possible positive or negative compensation signal, and in order to check the exact position of the seats upon each movement by one row produced by the motor M1 and emit a possible positive or negative compensation signal.

A device 35 for simultaneously removing the products P arranged in a preset number of flanking seats and for depositing them in rows R, for example on a conveyor 36 which feeds a cartoning machine, which is not illustrated, is provided at the unloading side 12.

In the illustrated example, the device 35 is formed by a pusher rake 37 which is supported by cylindrical guides 38 and is moved by a fluid-activated jack 39. The rake 37 is provided with pairs of teeth 40 which are aligned with each seat 25 and move each product out of its respective seat when the jack 39 is extended.

It should be noted that by virtue of the substantially quadrangular configuration of the bed 10, the device 35 can also be arranged on the connecting side 13, so that the row unloading direction is, if required, perpendicular to, instead of coincident with, the single-product flow direction.

The operation of the described machine is as follows: assuming that the swinging portion 27 of the single-line conveyor is angularly shifted clockwise in the position shown in broken lines and designated by 270, every time a product P transits on the belt 27a the photocell 32 energizes the motor M2, which actuates the sprocket 31 and makes said swinging portion 27 perform an angular movement equal to one pitch in a counterclockwise direction.

The products P which progressively arrive are thus deposited in the subsequent adjacent seats 25 and a counter (not illustrated) stores the number of deposited products. Once the number of products required for each row (for example six) has been reached, the counter issues an energization pulse for the motor M1, which moves the chains 21 and 22 counterclockwise by an extent equal to the extension of the row, said movement being controlled by the encoder E1, which decreases the count of said counter. By virtue of the meshing of the pinion 31 with the chain 21, this movement also causes the conveyor portion 27 to swing and thus move to return to the position 270 and resume the loading cycle. Once the movement has occurred, the motor M1 stops the chains 21 and 22 in order to allow to unload the products.

If a product P arrives on the conveyor portion 27 during this movement, the photocell 32 activates the motor M2 which, by means of the sprocket 31, moves said conveyor portion counterclockwise by one pitch, allowing to deposit the product in a seat 25 even during said movement.

The number of products which form the row can be set on said counter by means of a simple keyboard preset for this purpose and not illustrated in the figure.

Naturally, without altering the concept of the invention, the details of execution and the embodiments may be varied extensively with respect to what is described and illustrated by way of non-limitative example without thereby abandoning the scope of the invention.

I claim:

1. Machine for grouping in parallel rows products arriving in a single line, particularly for feeding cartoning machines, comprising:

at least one actuation chain which is closed in a loop and is guided by toothed pinions along a path which comprises a side for loading individual products, which has the shape of an arc of a circle, and a straight side for unloading the rows, a plurality of movable seats which are supported by said chain with a constant spacing pitch and are suitable for moving along the entire perimeter of said path to receive the products on the loading side and carry them to the unloading side, first advancement motor means for moving said chain by steps which are equal in length to the number of products which form each row and for moving the seats from the loading side to the unloading side of the path, a belt conveyor for the single line of products, comprising at least one terminal portion which swings in the horizontal plane and is pivoted at the center of curvature of the circular arc-like loading side of the path of the chain, second advancement motor means which are supported by the swinging portion of the conveyor and mesh with said chain in order to move said terminal portion in a stepwise manner, align its end with the individual seats and feed the products into each seat both during translatory motion and when the first motor means are inactive, means for removing the rows of products from the unloading side of the path of the chain, and means for controlling said first and second advancement motor means and for energizing them for a fixed duration according to the translatory motion of each row of seats and according to the stepwise movement of the swinging portion of the conveyor.

2. Machine according to claim 1, wherein said first advancement motor means comprise an electric motor which is associated with one of the toothed pinions for guiding the actuation chain.

3. Machine according to claim 1, wherein said second advancement motor means are arranged at the non-pivoted end of the swinging portion of the conveyor and comprise an electric motor and a toothed sprocket which is actuated by the motor and meshes with said actuation chain.

4. Machine according to claim 2, wherein said first advancement motor means comprise an encoder which, upon each energization command, causes the motor to perform such a number of turns as to move said actuation chain by an extent equal to the number of products intended to form each row.

5. Machine according to claim 3, wherein said second advancement motor means comprise an encoder which, upon each energization command, causes the motor and the sprocket to perform such a number of turns as to move said swinging portion of the conveyor by a seat spacing pitch.

6. Machine according to claim 4, wherein a command for energizing the first advancement motor means is issued by a programmable counter which detects the presence of products in a preset number of seats.

7. Machine according to claim 5, wherein a command for energizing the second advancement motor means is issued by an optical sensor which is sensitive to the passage of the products on the swinging portion of the conveyor.

8. Machine according to claim 1, wherein the means for removing the rows of products are arranged on an unloading side which is opposite to the loading side, the row transfer direction coinciding with the direction of feeding of the individual products.

9. Machine according to claim 1, wherein the means for removing the rows of products are arranged on an unloading side which is adjacent to the loading side, the row transfer direction being at right angles with the direction of feeding of the individual products.

10. Machine according to claim 1, wherein said means for removing the rows of products comprise a rake-like pusher which is moved by a fluid-activated jack; said rake-like pusher being provided with pairs of teeth which are aligned with each seat and are suitable for moving each product out of its respective seat.

* * * * *